United States Patent [19]

Glitsch et al.

[11] 3,969,447
[45] July 13, 1976

[54] GRIDS FOR FLUID CONTACT APPARATUS

[75] Inventors: Michael C. Glitsch, Aubrey; Bedford L. Kitterman, Lakewood Village, both of Tex.

[73] Assignee: Fritz W. Glitsch & Sons, Inc., Dallas, Tex.

[22] Filed: Oct. 18, 1973

[21] Appl. No.: 407,585

[52] U.S. Cl................................ 261/111; 202/158; 261/112; 261/DIG. 11
[51] Int. Cl.² .......................................... B01F 3/04
[58] Field of Search .......................... 261/108–112, 261/DIG. 11; 202/158; 23/283

[56] References Cited
UNITED STATES PATENTS

| | | | |
|---|---|---|---|
| 1,486,032 | 3/1924 | Pourcel | 261/112 |
| 1,815,898 | 7/1931 | Brassert et al. | 261/111 |
| 2,206,440 | 7/1940 | Walker | 261/112 |
| 2,394,133 | 2/1946 | Zimmerman | 261/110 |
| 3,039,749 | 6/1962 | Kohl et al. | 261/112 |
| 3,084,918 | 4/1963 | Kohl et al. | 261/112 |
| 3,227,429 | 1/1966 | Renzi | 261/112 |
| 3,340,341 | 9/1967 | Bruder | 261/112 X |
| 3,343,821 | 9/1967 | Winn et al. | 261/112 |
| 3,389,895 | 6/1968 | DeFlon | 261/111 |
| 3,430,935 | 3/1969 | Garrett | 261/109 |
| 3,480,406 | 11/1969 | Luckenbach | 261/109 X |

*Primary Examiner*—Frank W. Lutter
*Assistant Examiner*—Richard L. Chiesa
*Attorney, Agent, or Firm*—Joseph H. Schley; Thomas L. Cantrell

[57] ABSTRACT

Disclosed is a multi-functional grid structure for use in a vapor-liquid contact apparatus which includes a plurality of layers of relatively thin ribs. Some layers of ribs are flange-free and act as liquid distributors. Some layers of ribs include ribs with flanges and act as vapor-liquid contact devices. Some layers of ribs may have ribs with flanges having upturned edges which form channels, and such layers act as liquid collectors. A single grid structure performing these multiple functions normally requires only a single support structure, thereby saving on tower structure and cost.

5 Claims, 24 Drawing Figures

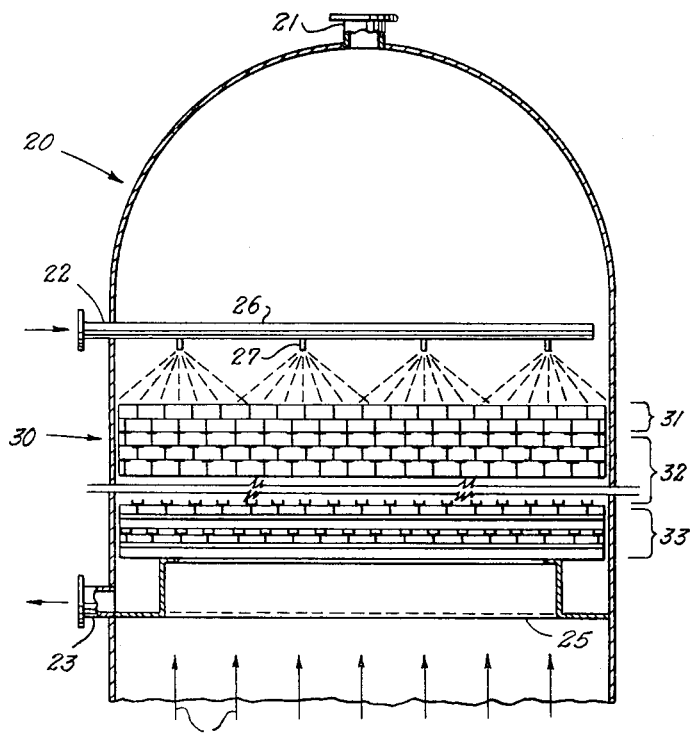
Fig. 1
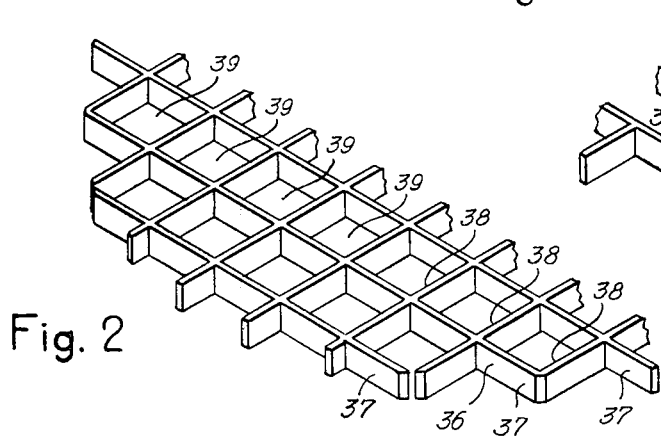
Fig. 2
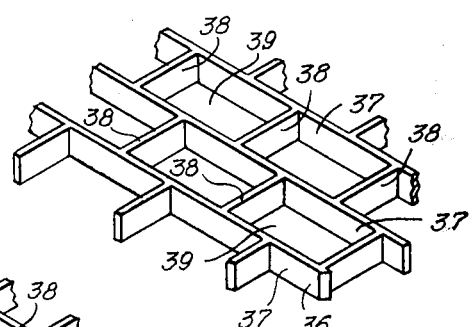
Fig. 2-A
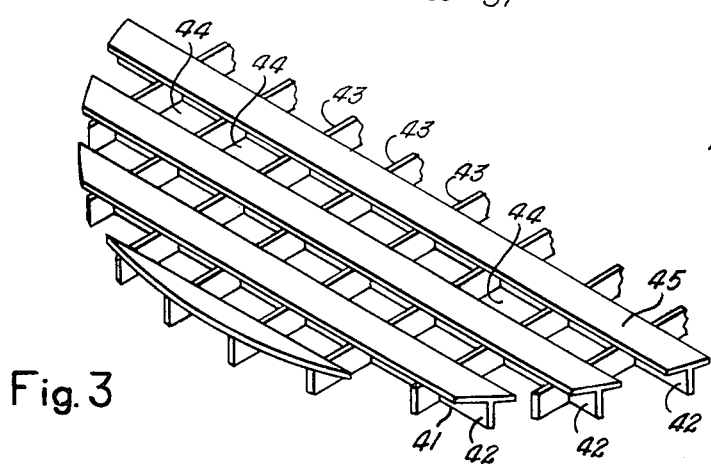
Fig. 3
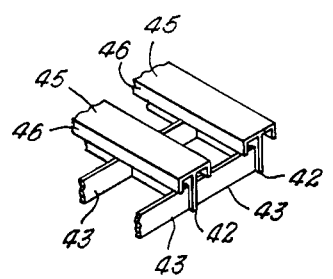
Fig. 3-A

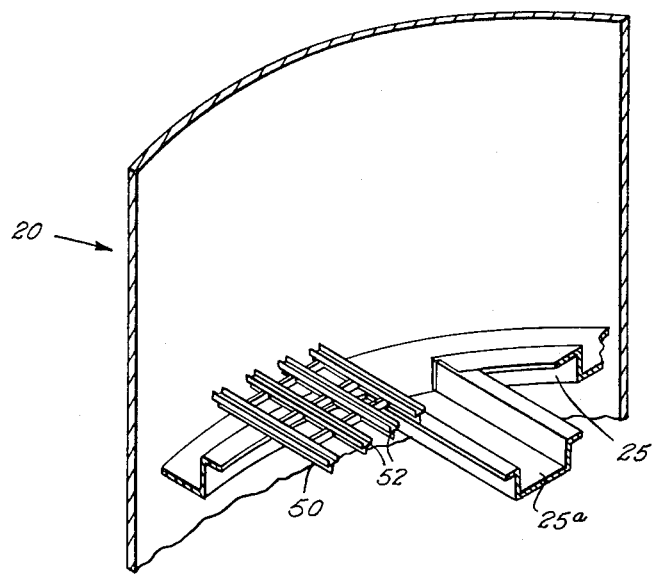
Fig. 12
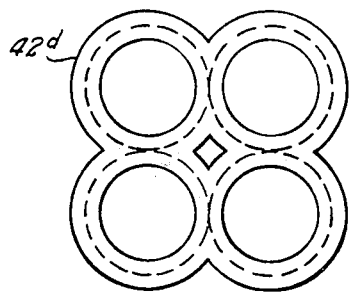
Fig. 13-A
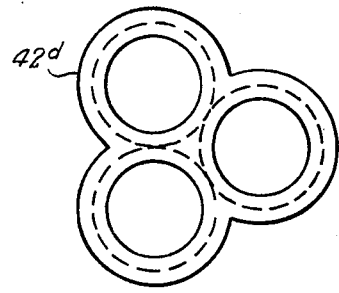
Fig. 13-B
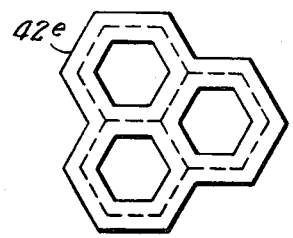
Fig. 13-C

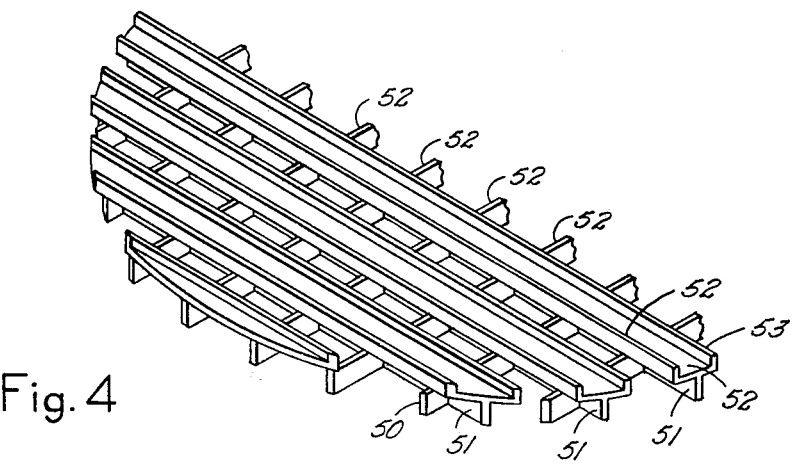
Fig. 4
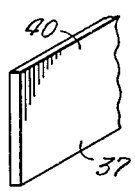
Fig. 5-A
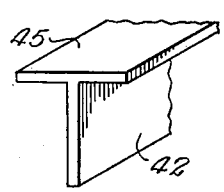
Fig. 5-B
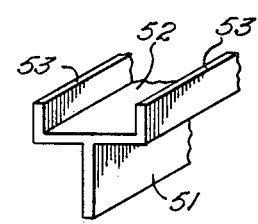
Fig. 5-C
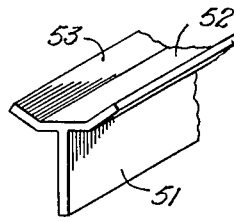
Fig. 5-D
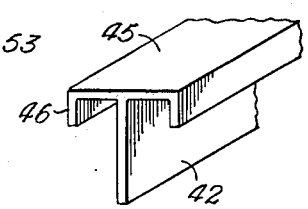
Fig. 5-E
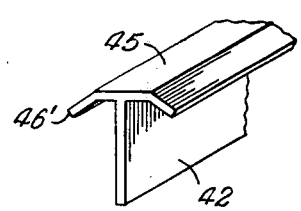
Fig. 5-F
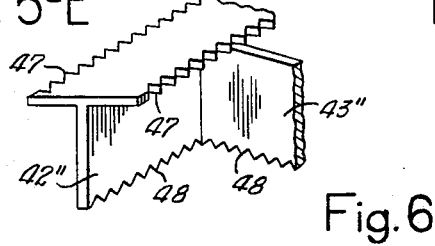
Fig. 6
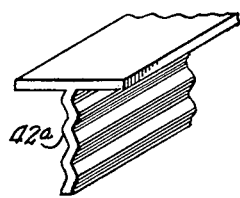
Fig. 7-A
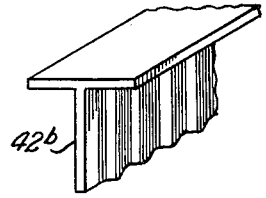
Fig. 7-B
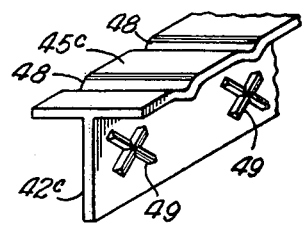
Fig. 7-C

GRIDS FOR FLUID CONTACT APPARATUS

BACKGROUND OF THE INVENTION

This invention relates to new and useful improvements in grids for vapor-liquid contact apparatus.

In the chemical engineering art, there are many instances where mass transfer reactions, energy transfer reactions, and chemical reactions, or combinations of these are carried out by bringing a vapor and a liquid into intimate contact with each other, usually within a vessel such as a refining tower. In continuous processes, liquid and vapor feed stock streams are continuously introduced to the vapor-liquid contact vessel, and vapor and liquid product streams are continuously withdrawn. The flow paths of the two streams through the vessel are in most instances of the countercurrent type, with the liquid being introduced at or near the top of the vessel, and withdrawn at the bottom, and with the vapor being introduced at or near the bottom of the vessel and withdrawn at the top. In some instances, concurrent flow, with both streams moving through the vessel in the same direction, is employed.

It is the practice to mount within the vapor-liquid contact vessel passive apparatus or structure intended to insure that the liquid and vapor achieve the desired degree of contact with each other so that the planned reaction occurs at the designed rate. The internal structure is passive in the sense that it is not power driven and has few or no moving parts. (Those parts that do move do so under the influence of the vapor or liquid moving through the vessel.) Various kinds of structures have been employed, including bubble trays, packed columns, and grids.

In these passive vapor-liquid contact devices, an important goal is to present a structural and surficial geometry which encourages the liquid moving through the device to form itself into films having, in the aggregate, a large area past which the vapor sweeps. But the design problem is not merely a matter of providing a large amount of surface area, because a number of other interrelated considerations must be taken into account.

From a process standpoint, it is important that the desired vapor-liquid contact reaction be carried as close to completion as possible. For example, in a crude oil vacuum tower, close fractionation and good separation are needed to produce gas oil streams that are free of undesirable residual elements, such as solids, Conradson carbon, and metals which are sometimes present in the feed stock, and to produce a "bottoms" stream which is low in gas oil content, so that desired product is not lost. Thus, both product quality (purity) and quantity (yield) hinge on effective and efficient performance of the vapor-liquid contact reaction.

From an operational viewpoint, the contact vessel and its internal apparatus must utilize the heat supplied to the unit efficiently, to minimize direct operating costs, whether the reaction is mass transfer, heat transfer, liqid vaporization, or vapor condensing duty. Furthermore, the reaction should be accomplished with a minimum pressure drop, since provision of the required pressure or vacuum is also an operating cost.

It is also desirable that the internal vapor-liquid contact apparatus be corrosion resistant, and resistant to fouling and coking, in order to lengthen the time between maintenance shutdowns. By the same token, the apparatus should be easily cleaned, repaired, removed and replaced through vessel man-ways to shorten the downtime during maintenance "turnarounds", since such time is lost production time, and an indirect operating cost.

Turning next to constructional or capital considerations, the vapor-liquid contact apparatus should be simple and economical to build. Some contact devices have been proposed or even built and used, which have been excellent from the process and operational standpoints, but which have been difficult to fabricate because of their complexity, and thus represent excessive capital cost.

An efficient vapor-liquid contact apparatus utilizes less tower or vessel space than an inefficient one doing the same work. Efficiency thus bears directly on capital costs, and the effect is accentuated, since the costs of both the apparatus and the enclosing tower are directly proportional to the amount of material required to produce them.

The matter of tower size is particularly important from a capital cost standpoint, because some cost elements of towers accelerate with increase in size. It is economically important to utilize as small and as short a vessel as practical, commensurate with its desired capacity and efficiency, because the cost of handling, shipping and erecting a vessel is directly proportional to its size. Furthermore, the necessary wall thickness of a vessel designed to operate at a designated internal pressure is directly proportional to the diameter of said vessel; hence, a further saving in weight for a given vessel can be effected if the vessel can be made smaller in diameter by reason of a functionally more effective vapor-liquid contact internal apparatus. It is also a recognized engineering principle that the shorter a vessel may be designed, the less metal will be required in the vessel per se and in its foundation base for wind load requirements. Likewise, it should be understood that the wall thickness and stiffener supports will not require as much material for vacuum service when a tower can be reduced in diameter.

In the vapor-liquid contact art, vessels or towers vary widely in size, ranging from pilot plant towers of only a few inches in diameter, to towers in excess of 40 ft. – 0 inches in diameter, depending on the desired capacity or throughput. If the requirements dictate a tower in excess of 10 or 12 feet, auxiliary supports are normally required to support the tower internals, including the vapor-liquid contact apparatus. Such auxiliary supports require additional tower height and cost, because room must be provided for them.

Normally, a vapor-liquid contacting apparatus utilizing packing material of either the bulk type or grid type, or any other type, requires, for a given zone, a means of introducing the liquid into said zone, a means for uniformly distributing the liquid into said zone, a means for creating intimate vapor-liquid contacting in said zone and a means, if required, to collect the liquid after it has passed through the upper sections of said zone.

It has been normal in the art to handle the last three functions (liquid distribution, vapor-liquid contact, and liquid collecting) in whole or in part by separate units that are separately supported. In doing this, valuable space of height in the tower is utilized to provide room for the supporting structures for these three functional sections, and in many cases additional height of tower is needed to provide volumetric space for stabilizing either the ascending vapor flow, or descending liquid flow, or both.

In some vapor-liquid contact towers it is necessary to remove part of the liquid product in side streams at one or more elevations along the height of the tower. In accordance with conventional practice, collector means are mounted in the tower at such point, and a separate set of vapor-liquid contact equipment, including liquid introducing means, liquid distributing means, the vapor-liquid contact means itself, and the next lower collector means, are all positioned below the side stream drawoff point, together with the necessary supporting structure for this equipment, and tower space for stabilizing flow of vapor and liquid. In effect, then, the tower is broken into a series of vertically stacked segments, or zones, with a substantially complete set of internal tower equipment being located between each side stream drawoff point and the next higher or lower drawoff point.

Thus, in a tower with several side streams, conventional practice tends to drive the capital cost up, because the amount of space in the tower required for the auxiliary functions of liquid distribution and collection, mechanical support, and vapor flow stabilization is multiplied by the number of side streams. Tower space devoted to these auxiliary functions is just as expensive as space devoted to vapor-liquid contact, but contributes only indirectly to the carrying out of vapor-liquid contact reactions.

The foregoing considerations may be summarized as follows: it is desirable that vapor-liquid contact apparatus produce good product quality and yield, at a good thermal efficiency and low pressure drop; that it be practical and simple to construct and maintain; and that its size and the tower size be minimized while throughput capacity is maximized.

SUMMARY OF THE INVENTION

In accordance with the present invention, a multi-functional grid structure is provided which meets the foregoing criteria well and overcomes many deficiencies in prior art devices caused by necessary compromises between the various considerations. The grid of the invention is a passive device capable of three distinct functions, those of liquid distribution, vapor-liquid contacting, and liquid collecting for withdrawal (with or without reintroduction at a different point in the tower).

As was mentioned above, vapor-liquid contact grids have been employed in towers before, but, unlike the grid structures of the present invention, only for vapor-liquid contact or contacting purposes. The grid structure of the invention acts as its own liquid distributor, so that a separate liquid distributor is not needed, and the support structure for the separate device can be eliminated also. In this manner, tower space is saved, thereby lowering capital costs.

The grid structure of the invention also acts as its own liquid collector, eliminating the need for separate equipment for this purpose, and eliminating the additional tower space and support structure such separate equipment entails. Furthermore, since the grid, or more precisely, a special portion thereof, functions as a liquid collector, the location for liquid collecting is no longer limited to the bottom of a grid zone. Partial or complete liquid collection can be conducted at one or more locations within the grid structure, if desired, thus providing great freedom for designers faced with special processing problems.

Finally, the grid structure of the invention acts as an excellent vapor-liquid contact device. Many individual features of the invention, discussed in detail hereinbelow, contribute to the superior vapor-liquid contact characteristics of the grid structure, but a prime factor is the ease and flexibility with which regions having special properties can be established within the grid. Thus, if a region of high vapor turbulence is deemed necessary in part of the grid structure, it can be provided without disarraying the properties of the remainder of the structure. Similarly, regions with liquid dividers, or with vapor dividers, can be readily provided. In addition, regions in the grid structure can be created in which the liquid filming action differs from that in other regions.

The grid structure of the invention is of the shallow vertical rib type. In its preferred forms the ribs are arranged in a layer, or more usually, a plurality of contiguous layers. In small towers the ribs in each layer may be connected together to form a unit; in large towers it is preferred that the layers be formed of a series of smaller panels dimensioned for easy handling and for passage through the manways of the tower.

The ribs in each layer are connected together to form a series of box-like compartments which are open-topped and open-bottomed to provide for flow of liquid and vapor in directions perpendicular to the plane of the layer. While in its preferred form the ribs are rectilinear, and the compartments as a consequence are rectangular or other straight sided polygons, the invention in its broader aspects is not so limited, and the ribs may be configured and connected together to form round compartments, oblong compartments or polygons with relatively large numbers of sides, such as hexagons.

The ribs, and the panels formed from them, are constructed of materials strong enough, in view of their dimensions, to render them self-supporting when laid on a peripheral support member in a tower. (In very large diameter towers some supplementary support structure in the center of the tower may be needed in addition to the peripheral tower support.) Further, the ribs and panels are strong enough to support a multi-layer stack of additional panels placed above them, even one many feet thick. In this way, in accordance with the invention, a multi-functional grid structure is provided which required only a single tower support. The conventionally provided separate support structures for each functional device are eliminated, with a consequent saving in tower and support structure cost.

In accordance with the multi-functional aspect of the invention, some portions of the grid structure are constructed of shallow vertical ribs which are flange-free, other portions of the grid structure contain ribs which are provided with flanges along their tops or bottoms, and still others contain ribs which are provided with flanges having upstanding margins thereon that form troughs. (If a particular function does not need to be performed by a given grid structure, the specially configured ribs performing that function may be omitted.)

It is a special feature of the invention that great flexibility of design and construction of completed grid structures is achieved by the use of a relatively small number of types of basic parts — the ribs, which can be connected together in many ways to form a wide variety of primary subcomponents — the panels or layers, and from this wide variety of layers, a very large number of multi-functional grid configurations can be assembled. Grid structures can thus be custom built readily from mass-produced basic parts, and the manufacturing inventory can be held primarily at the basic parts level, thus lowering manufacturing costs.

A related advantage of the invention lies in the fact that most of the rib configurations involved in the invention are of uniform cross-section or profile. They are thus adapted to manufacture by extrusion, injection molding, or rolling operations when materials shapable by such operations are the selected materials of construction.

OBJECTS OF THE INVENTION

It is one object of the invention to provide an improved grid whereby it may function in a threefold manner; i.e., as a uniform liquid distributor into the grid bed; as a vapor-liquid contactor; and as a collector for the liquid, which may be withdrawn from the tower in whole or in part and/or conducted in whole or in part to a desired location below said grid zone, without the use or need for an auxiliary or separate liquid collector tray.

Another object of the invention is to provide a grid bed in which the vapor passage area, surficial area, surface area, and vapor-liquid distribution characteristics will efficiently perform their particular function of the threefold grid invention with maximum efficiency and minimum utilization of volumetric space.

A further object of the invention is to provide a grid of which one or more of the layers primarily act as a liquid distributor to uniformly distribute the liquid into the grid bed zone and prevent a maldistribution of said liquid from a spray header system or distributor plate, by eliminating splashing or other maldistribution that can be created by the velocity and angle of impingement of said liquid from a spray header system supplying liquid to the grid bed zone and the interaction of the ascending vapor velocity and turbulence with said liquid.

Another object of the invention is to provide a grid bed or zone of contiguous layers in which certain of the membranes that make up a grid layer rest upon the horizontal surface of the grid layer therebelow, to substantially block or dam a transmission or flow of the liquid longitudinally along said horizontal surface.

The foregoing are major objects and purposes of the invention. These, together with other more specific objects and purposes, may be best understood by a consideration of the detailed description which follows, together with the accompanying drawings.

DESCRIPTION OF THE DRAWINGS

FIG. 1 is a somewhat diagrammatic sectional elevational view of a vapor-liquid contact tower having one embodiment of the multi-functional grid structure of the invention installed therein;

FIG. 2 is a fragmentary isometric view of a layer of the grid structure of the invention, the layer shown being one which is particularly useful in the liquid distributor portion of the structure;

FIG. 2-A is a fragmentary isometric view of an alternate form of grid layer useful for the liquid distributor function;

FIG. 3 is a fragmentary isometric view of a layer of the grid structure in which some of the ribs are provided with flanges at their tops to enhance vapor-liquid contact;

FIG. 3-A is a fragmentary isometric view of an alternate form of a layer having some flanged ribs configured to create high turbulence in ascending vapor.

FIG. 4 is a fragmentary isometric view of a layer of the grid structure in which some of the ribs are provided with flanges having upturned margins, forming troughs, said layer being particularly useful in the liquid collector portion of the structure;

FIG. 5-A is a fragmentary isometric view of a flange-free rib;

FIG. 5-B is a similar view of a flanged rib;

FIG. 5-C is a similar view of a flanged rib having vertically oriented upstanding margins;

FIG. 5-D is a similar view of a flanged rib having flared upstanding margins;

FIG. 5-E is a similar view of a rib having vertically oriented downturned flanges;

FIG. 5-F is a similar view of a rib having flared downturned flanges;

FIG. 6 is a fragmentary isometric view of a flanged rib and a connecting flange-free rib, both of whose edges are sawtoothed to provide liquid drip points;

FIGS. 7-A, 7-B, and 7-C are fragmentary isometric views of flanged ribs having corrugated or embossed surfaces for special film forming effects;

FIG. 12 is a somewhat diagrammatic fragmentary isometric view of the interior of a tower, showing a portion of a collector layer of the grid structure of the invention, a portion of a tower support means which also acts as a tower collector means, and the mode of cooperation of these parts; and FIGS. 13-A, 13-B, and 13-C are fragmentary plan views of alternate forms of grid layers of the invention.

DESCRIPTION OF THE PREFERRED EMBODIMENTS

Figure 8:
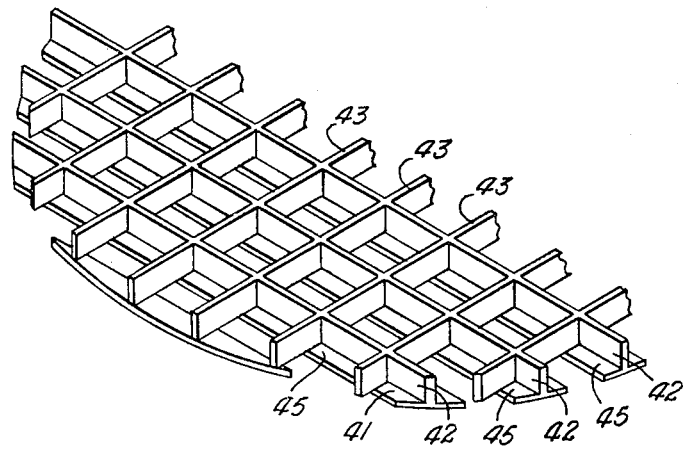
FIG. 8 is a fragmentary isometric view of the grid layer of FIG. 3, but inverted so that the flanges are at the bottom of the ribs, such inverted orientation being particularly useful in some vapor-liquid contact applications.

FIG. 1 shows part of a vapor-liquid contact tower, designated generally as 20, which may be taken as typical of the type of vessels in which the grid structure of the invention is employed. Tower 20 has a vapor outlet 21, a liquid inlet 22, and a side stream liquid drawoff outlet 23. In FIG. 1, vapor may be considered as having been introduced into a portion of tower 20 below that portion appearing in the figure, said vapor coursing upwardly from its point of introduction, as indicated by the arrows 24.

Drawoff outlet 23 communicates with an internal tower support and liquid collector means 25. This device is in the form of a peripheral wall-mounted trough, and is sized to accommodate the designed volume of liquid flowing through it, and to have sufficient strength to support the grid structure of the invention, which is placed upon it. Liquid inlet 22 communicates with spray header 26, which is positioned in tower 20 above the grid structure of the invention. Spray header 26 has a plurality of nozzles 27 configured and positioned to direct a spray or shower of liquid downwardly onto the grid structure of the invention.

In FIG. 1, the multi-functional grid structure of the invention is designated generally as 30. The grid structure 30, the spray header 26, and the peripheral collector 25 together comprise a single vapor-liquid contact zone in tower 20, and the tower may contain one or a number of such zones.

As has been outlined above, grid structure 30 is capable of performing three distinct and separate functions, and for this purpose has three superimposed regions which are demarked by brackets at the right of FIG. 1. Liquid distribution region 31 comprises one or more grid layers at the top of the grid structure; vapor-liquid contact region 32 comprises one or more (usually several) grid layers below region 31; and liquid collection region 33 comprises one or more grid oayers in the lower portion of the grid structure.

The flow paths through tower 20 are as follows: vapor ascends from a lower part of the tower into the zone containing grid structure 30. It passes upwardly through the grid, undergoing contact with liquid descending therethrough, and finally leaves the tower through outlet 21. Liquid is introduced through inlet 22 and spray header 26. It falls downwardly through grid 30, passing first through liquid distributor region 31, which acts to insure its uniform distribution across the area of the grid. It then passes downwardly through vapor-liquid contact region 32, where the main contact between vapor and liquid is effected. The liquid next passes downwardly into the liquid collection section of the grid, where part of it is intercepted by the beforementioned troughs. This fraction of the liquid flows along the troughs and out their ends into the peripheral liquid gathering means 25, leaving the tower through drawoff outlet 23. The fraction of the liquid which is not intercepted and collected for withdrawal in this manner descends into the next lower zone at the tower. The proportions between the withdrawn fraction and the descending fraction can be adjusted by increasing or decreasing the areas of the collecting troughs.

As can be seen in FIG. 1, the liquid distributor region 31 consists of layers constructed of flange-free ribs, while vapor-liquid contact region 32 consists of layers some of whose ribs have flanges. In the embodiment of FIG. 1, the flanged ribs of each layer are all parallel to each other. While this is a preferred construction, other arrangements are also possible, as will appear hereinbelow. The liquid collector region 33 consists of layers some of whose ribs have flanges with upstanding margins forming troughs. Again, in the embodiment of FIG. 1, the flanged ribs in the layers of this region are all parallel to each other with a given layer, although other constructions are possible.

Figure 9:
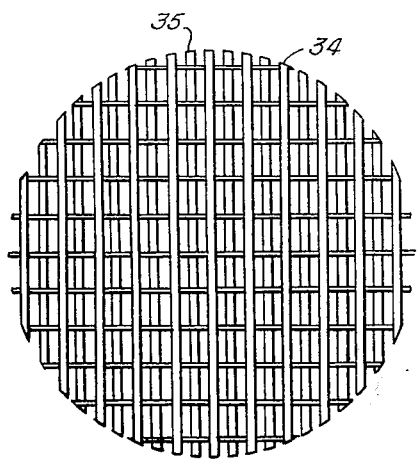
FIGS. 9, 10, and 11 are somewhat diagrammatic plan views of portions of grid structures constructed in accordance with the invention, each showing two contiguous layers, and the three figures taken together illustrating variations in angular alignment between layers which are available in accordance with the invention.
Figure 10:
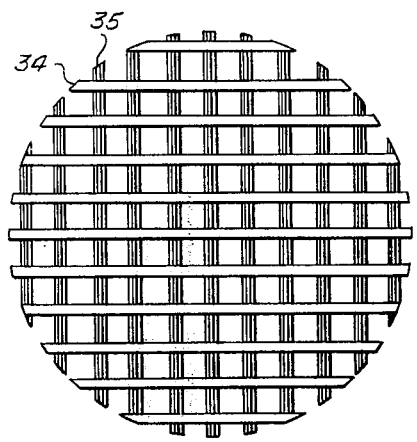
Figure 11:
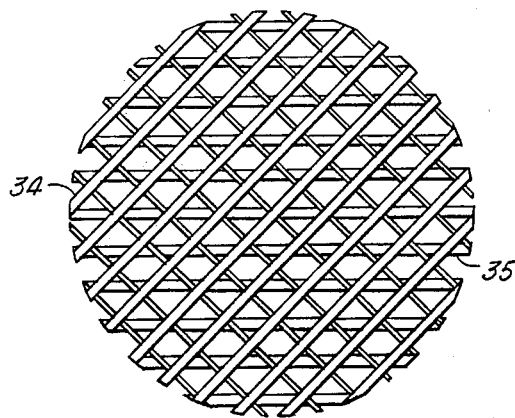

Attention is now directed to FIGS. 9, 10, and 11, which show in plan view two contiguous layers of the type employed in the vapor-liquid contact region of the grid structure. In each figure, the layers are of the kind in which all of the flanged ribs are parallel to each other. In FIGS. 9, 10, and 11, the upper layer is designated 34, while the lower layer is designated 35. By considering these three figures together, it can be seen that successive layers of the grid structure of the invention can be positioned with an infinite variation of angular relation to each other, ranging from parallel (FIG. 9), through 45 degrees of angularity (FIG. 11), to orthogonal (FIG. 10). Furthermore, the pattern of angularity from layer-to-layer need not be maintained uniformly throughout the height of the grid structure, but may be varied gradually or abruptly as desired.

FIG. 9 also illustrates the fact that the flanged ribs of contiguous layers may be laterally offset from each other, as they are shown in that figure, or they may be aligned, if desired.

THE LIQUID DISTRIBUTOR SECTION

The structure and operation of the ribs, and layers or panels of ribs employed in this section are shown in FIGS. 2, 2-A, and 5-A. From FIG. 2, it can be seen that a liquid distributor panel 36 is made up of relatively narrow vertically oriented longitudinal or primary ribs 37 connected together by transverse or secondary ribs 38, which are also vertically oriented. The primary and secondary ribs are so connected that a series of box-like open-topped and open-bottomed compartments 39 are formed through which vapor can move upwardly and liquid downwardly. As is shown in FIG. 2-A, the secondary ribs 38 may be offset from one primary rib 37 to another so that the box-like compartments 39 are arranged in offset rows. FIG. 5-A shows that each rib 37 is uniform in cross-section or end profile and presents a narrow upper surface 40.

The narrowness of the upwardly presented surfaces 40 of ribs 37 and 38 is important to the liquid distribution function of panel or layer 36. The nozzles 27 of spray head 26 (FIG. 1) are designed and positioned to introduce liquid into the tower uniformly over its horizontal area. But the liquid rains downwardly with some violence, and will splash or ricochet off any horizontal or near horizontal surface it hits, and thus move laterally across the tower. As can be seen from FIG. 1, not all streams of the shower of liquid encounter the top of the grid structure at the same angle, which will cause a variation in the lateral distance each stream splashes. These effects, when combined with the influence of turbulence and lateral migration of ascending vapor, tend to cause a maldistribution of liquid entering the grid, notwithstanding efforts to produce a uniform spray pattern. Some areas of the grid structure will tend to be starved of descending liquid, while others will be over-supplied. Both conditions are bad for efficiency.

By minimizing the upwardly presented horizontal surficial area of the liquid distributor grid layers 36, through the use of narrow flange-free ribs, splashing of downcoming liquid is minimized, and the uniformity of the spray pattern is preserved as the liquid moves into the grid. Almost all of the liquid which rains downwardly into the grid, if it encounters a surface at all, encounters one that is vertical which confines its lateral movement and directs it downwardly toward the vapor-liquid contact region of the grid structure.

The number of layers beyond a single layer in the grid distributing section is determined for a particular installation by the amount, density and velocity of the liquid introduced through the spray distributor means, as well as the ascending vapor amount, density and velocity. It should be noted that in each layer a minimal surficial area is presented by the liquid distribution grid section, which minimizes the amount of liquid sprayed on the vapor distributor grid section that is subject to splashing upwardly.

THE VAPOR-LIQUID CONTACT SECTION

The structure and operation of the ribs and layers or panels of ribs employed in this section are shown in FIGS. 3, 3-A, 5-B, 5-E, 5-F, 6, 7-A, 7-B, 7-C, 8, 13-A, 13-B, and 13-C.

In FIG. 3, there is shown a fragment of a vapor-liquid contact layer 41, which is formed of vertically oriented longitudinal ribs 42, and transverse secondary ribs 43. Again, the primary and secondary ribs are connected together to form a series of box-like compartments 44. The longitudinal ribs 42 are provided with flanges 45 at their top edges (see also FIG. 5-B). The secondary ribs 43 are flange-free in the embodiment of FIG. 3, but may have flanges if it is desired.

The flanges 45 intercept part of the liquid descending through the grid and form it into films on the upper surface of the flanges. The liquid cascades from the edges of the flanges in sheets or free-falling films which are exposed to contact with vapor on both sides. The undersides of the flanges intercept and disentrain liquid being carried upwardly by ascending vapor, and form it into films which flow down the vertical sides of the ribs, again producing good film-vapor contact.

Grid section 41, as shown in FIG. 3, provides vertical membranes (both primary ribs and in line or offset secondary ribs) to function as vapor dividers, whereby the ascending vapor is caused to uniformly pass through the entire open planar area. The width of the horizontal surface of the primary grid membranes is such that the desired amount of free area is provided for as dictated by the particular process requirements of the unit and the allowable pressure drop, as well as the velocity limitations that may be required for a particular processing unit. The sudden localized constrictions in the area available for vapor flow caused by the flanges increases the vapor turbulence and enhances vapor-liquid contact.

FIG. 3-A shows a modified version of FIG. 3 in which the margins 46 of the flanges 45 on primary ribs 42 are downturned or in a vertical angular relationship to the flange of said membrane cross-section. This configuration increases vapor turbulence to encourage good vapor-liquid contacting. The structure of FIG. 3-A may be preferred in some instances, its use being dictated by the vapor load and velocity as well as the descending liquid velocity. FIG. 5-E illustrates the structure of a primary rib 42 employed in the embodiment of FIG. 3-A, while FIG. 5-F shows a variation, in which flange margin 46' is downturned, but at a flared angle instead of vertically downward. Both configurations in effect present a sharp orifice edge to ascending vapor to increase vapor turbulence.

An important feature of the invention is produced by the contiguous relationship of superposed grid layers, whether the layers are superposed with their longitudinal membranes or ribs in line, or alternately offset in parallel relationship, or alternately rotated in a position one to another from a parallel relationship to any degree of desired rotation up to a 90 degree position normal to other layers in the section (see FIGS. 9 – 11). In all of these cases the vertical membranes or ribs, either primary or secondary, or both, present dams or obstructions at short intervals to a transmission or flow of the liquid longitudinally along the flanges 45 of the primary vertical membranes or ribs 42 of a grid layer. This is an important feature of the invention because the cyclonic vortex in the ascending vapor stream will cause the liquid to form a heavy film on the horizontal flanges of the primary vertical membranes by creating a vapor barrier or side wall, which will cause said liquid to flow or be swept longitudinally along the horizontal surfaces of the primary vertical membranes toward the tower shell. In the absence of the damming provided in accordance with the invention, this would result in maldistribution of the descending liquid within the vapor-liquid contact section as well as a by-passing of the ascending vapor with little or no contact with the liquid.

Such means described above to prevent the transverse or longitudinal flow of the liquid along the top surface of the primary vertical membranes beneficially result in the maintaining of maximum concentration and/or temperature difference between the vapor and liquid streams uniformly over the entire surficial area of the vapor-liquid contacting layers that constitute the vapor-liquid contact section.

FIG. 8 shows a partial view of the vapor-liquid contact grid of FIG. 3 in an inverted position. It should be understood that the three primary sections of the threefold grid zone may include grid layers installed in whole or in part or by sections in inverted form, that is, with their flanges at the bottom of the ribs. For instance, as an example for the liquid distributor and vapor-liquid sections, the inverted form of FIG. 8 provides a liquid distributor grid upon which could be placed, if needed, one or more additional distributor grids as shown in FIG. 2 to perform the function of liquid distribution. Additional inverted grid sections, as shown in FIG. 8, placed in contiguous relationship therebelow constitute a vapor-liquid contact section with the secondary connecting membrane sections providing dams or blockages to the transmission of liquid longitudinally along the horizontally disposed portions of the primary vertical membranes. In the inverted form, the vertical secondary membranes and the vertical portion of the primary vertical membranes function as liquid dividers, which the volume or amount of descending liquid may require in its relationship with the ascending vapor load.

In accordance with the invention, ribs in the vapor-liquid contact region of the grid structure may be provided with special micro-surficial structuring to obtain extraordinary liquid distribution and vapor contact if process requirements in a given portion of the grid so require. Thus, as is shown in FIG. 6, a flanged rib 42" and the flange-free secondary rib 43" may have both the flange edges and the lower rib edges saw-toothed, as at 47 and 48, to provide liquid drip points. FIGS. 7-A and 7-B show flanged ribs 42a and 42b in which the rib portions are corrugated, one type of corrugation being horizontally oriented and the other vertically oriented. FIG. 7-C shows still another mode of microsurficial structuring. The flanged rib 42c has a flange 45c in which cross-troughs 48 are formed, and an embossed vertical rib portion, the embossing being indicated at 49.

As was mentioned above, the box-like compartments formed in all three functional regions of the grid need not be rectangular or square as those discussed so far herein. This point is illustrated by FIGS. 13-A, 13-B, and 13-C, which show portions of panels for use in the vapor-liquid contact region of the grid, and similar panels can be built for other regions. In FIGS. 13-A and 13-B, the vertical flanged ribs 43d are formed into circles, and are attached together at points of tangency. In FIG. 13-C, short flanged ribs 42e are attached together to form a "honeycomb" of hexagon-shaped compartments.

THE LIQUID COLLECTOR SECTION

The structure and operation of the ribs and layers or panels of ribs employed in this section are shown in FIGS. 4, 5-D, 5-E, 5-F, 12 and 3-A.

FIG. 4 shows a portion of a preferred grid layer 50 for use in the collector region of the grid structure. Like the layer of FIG. 3, it is made up of flanged, parallel primary ribs or membranes 51, and flange-free secondary ribs 52. Ribs 51 and 52 are connected together to form box-like compartments, and the constructional variations discussed above in connection with FIGS. 2 and 3 may also be implemented in the structure of FIG. 4.

The flanges 52 of primary ribs 50 are provided with upstanding margins 53 (see FIG. 5-C). In this manner a longitudinal trough is formed running along the top of rib 51. If desired, the upstanding margins 53 need not be vertically oriented, but may be flared at an angle, as is shown in FIG. 5-D.

The mode of operation of the layers in the liquid collector region may best be understood by a consideration of FIG. 12, which shows a portion of the interior of tower 20, and peripheral tower support and liquid gathering means 25. Also shown is a supplementary support beam 25a, shaped as a collector trough, of the kind which may be desirably employed in large diameter towers.

A grid layer 50 is positioned on supports 25 and 25a, with the ends of the troughed flanges terminating in position to spill liquid into liquid gathering means 25 (or 25a). A consideration of FIG. 12 will reveal that some of the descending liquid passing through grid 50 will be intercepted by troughed flanges 52, and carried therealong to gathering means 25. It should be understood that depending upon the amount of the liquid load and the amount of liquid to be collected, the channel configuration of the top portion of the primary vertical membrane elements may be essentially horizontally flat, without the longitudinal edges forming a trough, since the ascending vapor load in its sweeping action with the descending liquid load will cause the liquid to traverse the horizontal surface longitudinally disposed primary membranes into the collector pan or pans, because of the barrier created by the ascending vapor and the sweeping turbulent action of said vapor. Steps must be taken, however, to avoid the damming of such flow, as was desired in the vapor-liquid contact section.

If the grid of FIG. 3-A is viewed in an inverted manner (by analogy to FIGS. 3 and 8, discussed above) it can be seen that it will have liquid intercepting and conveying troughs and may be used as a liquid collector region layer, functioning in the same manner, essentially, as layer 50 of FIGS. 4 and 12. A grid layer having ribs configured as in FIG. 5-F may also be so employed.

What is claimed is:

1. A multi-functional grid system for use in a vapor-liquid contact vessel comprising:
    a grid positionable in a vessel and mountable on supports located in said vessel;
    said grid comprising a multiplicity of stacked layers of thin vertically oriented ribs with the upper layers being supported by the lower layers, each rib and layer being of relatively shallow height, said grid having at least three vertically superimposed zones;
    the ribs in the uppermost of said zones being flange-free and spaced with respect to each other and with respect to a downcoming spray of liquid to distribute the liquid substantially uniformly across the horizontal extent of said grid and prevent lateral migration of descending liquid as it courses downwardly through said uppermost zone;
    at least some ribs in the intermediate of said zones being provided with generally horizontally extending flanges for intercepting descending liquid and forming it into films on said flanges and ribs for contact with ascending vapor, for disentraining liquid being carried upwardly by ascending vapor, and for locally constricting the flow path of ascending vapor to create turbulence therein, the upper surfaces of said flanges being dammed at intervals by thin vertically oriented ribs to substantially prevent lateral migration of liquid therealong, said flanges being substantially coextensive in length with their associated ribs and extending transversely on both sides thereof;
    and at least some ribs in the lowermost of said zones being provided with generally horizontally extending flanges having upstanding margins, said flanges and margins forming liquid collecting troughs constructed and arranged to collect descending liquid and convey it laterally of the vessel and along the troughs to liquid gathering means, said flanges and margins being substantially coextensive in length with their associated ribs and extending transversely on both sides thereof.

2. A grid system in accordance with claim 1 in which all of the flanges in a given layer are oriented parallel to one another.

3. A grid system in accordance with claim 1 in which the flanges of said intermediate zone are dammed by ribs of layers immediately superjacent thereto.

4. A grid system in accordance with claim 1 in which the flanges of said intermediate zone are dammed by ribs in the same layer therewith.

5. In a grid system for use in a vapor-liquid contact vessel, said system being of the type comprising a multiplicity of stacked layers of thin vertically oriented ribs with the upper layers being supported by the lower layers, the improvement comprising:
    at least some ribs in said grid being provided with generally horizontally extending flanges for intercepting descending liquid and forming it into films on said flanges and ribs for contact with ascending vapor, for disentraining liquid being carried upwardly by ascending vapor, and for locally constricting the flow path of ascending vapor to create turbulence therein, the upper surfaces of said flanges being dammed at intervals by thin vertically oriented ribs to substantially prevent lateral migration of liquid therealong, said flanges being substantially coextensive in length with their associated ribs and extending transversely on both sides thereof, the flanged ribs in a given layer defining openings in the shape of closed curves.

* * * * *